Dec. 22, 1931.　　　T. W. BELL　　　1,837,648
JOINT LOCK
Filed Dec. 15, 1930
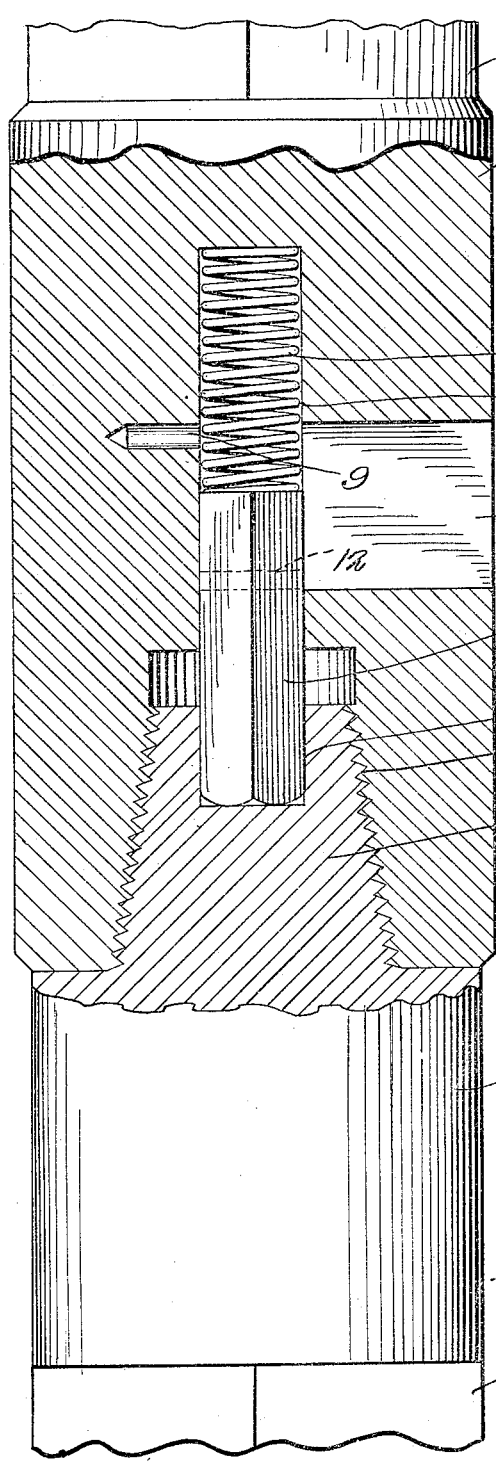
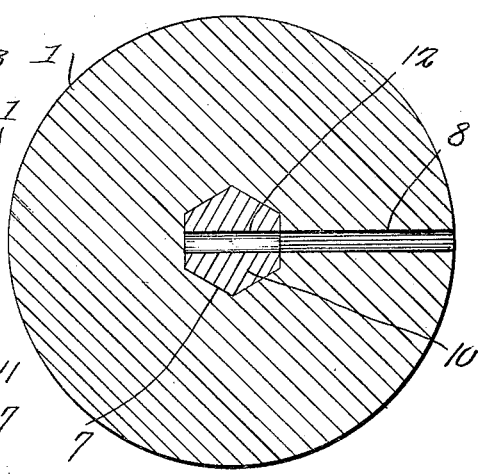
Fig. 2.
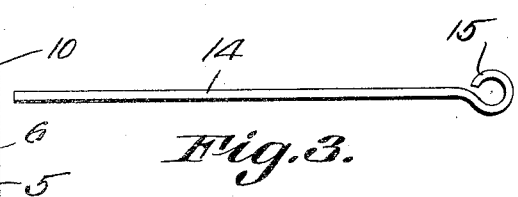
Fig. 3.
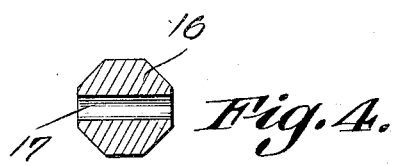
Fig. 4.
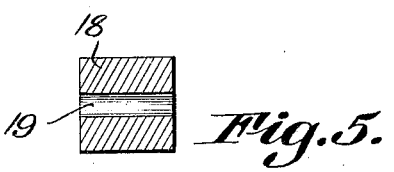
Fig. 5.
Fig. 1.
Inventor
T. W. Bell
By C. A. Snow & Co.
Attorneys.

Patented Dec. 22, 1931

1,837,648

UNITED STATES PATENT OFFICE

THOMAS W. BELL, OF PARKERSBURG, WEST VIRGINIA

JOINT LOCK

Application filed December 15, 1930. Serial No. 502,587.

This invention aims to provide a novel joint for use on jars, stems, bits, and the like, which are used for drilling oil, gas or water wells, with cable tools.

Figure 1 is a longitudinal section, with parts in elevation;

Figure 2 is a transverse section;

Figure 3 is an elevation of the latch;

Figures 4 and 5 are transverse sections showing modifications.

The numerals 1 and 2 indicate members which are to be threaded together, such as tools, or rods used in well drilling. Each of the members 1 and 2 has a portion 3 to receive a wrench. The lower member 2 has a tapered end piece 4 threaded into a socket 5 in the upper member 1.

A longitudinal opening or seat 6 is formed in the extremity of the end piece 4 and is polygonal in cross section. An axial polygonal opening 7 is formed in the member 1 at the end of the socket 5 and is polygonal in cross section.

An elongated transverse slot 8 is formed in the member 1 and extends inwardly to the polygonal opening 7. The slot 8 is located on one side of the opening 7. On the opposite side of the opening 7 there is a bore 9 of small diameter. The bore 9 does not extend entirely through the member 2, outwardly from the opening 7. The bore 9 is in alignment with the upper end of the slot 8.

A polygonal locking pin 10 slides longitudinally in the opening 7 and in the seat 6. The opening 7 and the seat 6 are so shaped with respect to the cross section of the locking pin 10 that the members 1 and 2 cannot turn with respect to each other on the locking pin 10.

A compression spring 11 is located in the opening 7. At its upper end, the compression spring 11 abuts against the member 1. At its lower end, the compression spring 11 engages the locking pin 10 to hold the locking pin in the seat 6. There is a transverse hole 12 in the locking pin 10.

The operator inserts a latch 14, provided at its outer end with an eye 15, into the slot 8 and into the hole 12 of the locking pin 10 and raises the locking pin until the latch 14 abuts against member 1 at the upper end of the slot 8. The operator then shoves the latch 14 lengthwise, until its inner end is received in the bore 9. This holds the locking pin 10 out of engagement with the seat 6 in the end 5 of the member 2, and the members 1 and 2 may be threaded apart or together. After the end 4 of the member 2 has been threaded into the socket 5 in the end of the member 2, the latch 14 is pulled out, and the compression spring 11 causes the locking pin 10 to engage in the seat 6, thereby holding the members 1 and 2 against rotation. If the locking pin 10 does not happen to engage in the seat 6, when the latch 14 is pulled out, a very small amount of relative rotation between the members 1 and 2 will permit the locking pin 10 to engage in the seat 6.

The locking pin 10 in Figure 1 is hexagonal in cross section, but it might be of some other polygonal cross section. Thus, the locking pin 16 of Figure 4 is octagonal, the hole, corresponding to the hole 12, being marked by the numeral 17. In Figure 5, the pin 18 is square, the hole appearing at 19.

By resorting to the use of the device shown in this application, the joints do not have to be tightened excessively, only natural shouldering being necessary, as the locking pin 10 holds the joints perfectly so that it cannot turn or unscrew while drilling, thus eliminating the excessive strain put on joints to keep them from unscrewing. The life of the joints of the class described, will be lengthened three or more times more than ordinary, because no excess strain is put on them. The device does away with many expensive fishing jobs, caused by breakage. It is possible to use soft steel pins and hard steel boxes, and use hard steel pins and soft steel boxes, and still have a perfect joint, and one that is entirely safe. Pulled threads and cupped joints will be done away with thereby lengthening the life of the threads. The structure can be used on any sized joint, straight or tapered, with a solid center.

Some may prefer to do away with the compression spring 11, but by using this spring greater safety is insured, since the spring holds the locking pin 10 firmly in place, so that there is no possible chance for the pin to become loose. The pins 10 may be made in different sizes, for different sized joints. Since it is not necessary to screw up the joint exceedingly tight, excessive scouring, scraping or cleaning of the threads will be unnecessary.

It is a matter of common knowledge that it is difficult to tighten up large joints, used in cable tool drilling, so that they will not unscrew while in use, but when the device forming the subject matter of this application is resorted to, the joint will not come unscrewed, even though the parts are not threaded together under great strain and tightly.

The diameter of the bore 9 is a small fraction of the length of the slot 8, the bore 9 extending outwardly from the opening 7 of the upper member 1. The transverse hole 12 of the locking pin 10 is of about the same diameter as the bore 9, the distance between the hole 12 and the lower end of the locking pin 10 being such that when the lower end of the locking pin 10 engages the bottom of the opening 6 in the lower member 2, the lower edge of the hole 12 will be in line with the lower end of the slot 8, so that the lifting latch 14 will be guided along the lower end of the slot 8 and into the hole 12. The upper edge of the bore 9 is in line with the upper end of the slot 8, whereby when the locking pin 10 is raised by the latch 14 until the latch 14 arrives at the upper end of the slot 8, the upper end of the slot 8 will guide the latch 14 into the bore 9 and hold the locking pin 10 elevated and clear of the lower member 2, when the latch 14 is advanced through the hole 12.

Having thus described the invention, what is claimed is:

In a device of the class described, upper and lower members threaded together and having polygonal openings in their threaded ends, the upper member being provided with a narrow longitudinal slot extended inwardly from its outer surface to its opening, the upper member being provided with a transverse bore the diameter of which is a small fraction of the length of the slot, the bore extending outwardly from the opening of the upper member, and a polygonal locking pin held against rotation in the openings but longitudinally slidable therein, out of engagement with the lower member, the locking pin having a transverse hole of about the same diameter as the bore, the distance between the hole and the lower end of the locking pin being such that when the lower end of the locking pin engages the bottom of the opening in the lower member, the lower edge of the hole will be in line with the lower end of the slot, so that a lifting latch will be guided along the lower end of the slot and into the hole, the upper edge of the bore being in line with the upper end of the slot, whereby when the locking pin is raised by the latch until the latch arrives at the upper end of the slot, the upper end of the slot will guide the latch into the bore and hold the locking pin elevated and clear of the lower member, when the latch is advanced through the hole.

In testimony that I claim the foregoing as my own, I have hereto affixed my signature.

THOMAS W. BELL.